United States Patent
Leatham

(10) Patent No.: US 11,644,699 B2
(45) Date of Patent: May 9, 2023

(54) PHOTONIC ACOUSTO-OPTIC FREQUENCY SHIFTER

(71) Applicant: Raytheon Company, Waltham, MA (US)

(72) Inventor: James Leatham, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 7 days.

(21) Appl. No.: 17/235,229

(22) Filed: Apr. 20, 2021

(65) Prior Publication Data

US 2022/0334420 A1    Oct. 20, 2022

(51) Int. Cl.
*G02F 1/125* (2006.01)
*G02F 1/335* (2006.01)

(52) U.S. Cl.
CPC .............. *G02F 1/125* (2013.01); *G02F 1/335* (2013.01)

(58) Field of Classification Search
CPC ... G02F 1/11; G02F 1/125; G02F 1/33; G02F 1/332; G02F 1/335; G02F 1/353; G02B 2006/1204
See application file for complete search history.

(56) References Cited

U.S. PATENT DOCUMENTS 7,894,125 B2   2/2011  Langdon

FOREIGN PATENT DOCUMENTS

| JP | 61-259233 A | * | 11/1986 |
| JP | 9-258285 A | * | 10/1997 |
| JP | 2004-294567 A | * | 10/2004 |

OTHER PUBLICATIONS

Z. Y. Cheng et al. Baseband integrated acousto-optic frequency shifter. Applied Physics Letters, 60, Jan. 6, 1992, pp. 12-14. https://doi.org/10.1063/1.107347 (Year: 1992).*
Cai et al., "Acousto-optical Modulation of Thin Film Lithium Niobate Waveguide Devices;" Research Article from *Photonics Research*, vol. 7, No. 9; Sep. 2019; 11 Pages.
Shao et al., "Integrated Microwave Acousto-optic Frequency Shifter on Thin-Film Lithium Niobate;" Research Article from *Optics Express 23728*, vol. 28, No. 16; Aug. 3, 2020; 11 Pages.

* cited by examiner

*Primary Examiner* — Michael Stahl
(74) *Attorney, Agent, or Firm* — Daly Crowley Mofford & Durkee, LLP

(57) ABSTRACT

Methods and apparatus for a photonic acoustic-optic frequency shifter having an integrated layer of lithium niobate. An input port receives input light and an acoustic wave generator generates an acoustic wave into a deflection area comprising a layer of lithium niobate. A first output port exits undeflected light from the deflection area as transmitted light and a second output port exits light deflected in frequency by the acoustic wave in the deflection area.

19 Claims, 5 Drawing Sheets

PHOTONIC ACOUSTO-OPTIC FREQUENCY SHIFTER

BACKGROUND

As is known in the art, acousto-optic modulators can be used in photonic signal processing systems. Currently available modulators require excessive SWAP (size, weight, and power), are limited to low-frequency operation (e.g., 10s to 100s of MHz), or suffer from low efficiencies.

Some commercially available acousto-optic modulators utilize bulk acoustic modes and as a result are limited to low-frequency (10-100s of MHz) operation. Furthermore, they require up to tens of Watts of RF input power. An alternative approach utilizes surface acoustic waves to deflect light confined by an ion diffused layer. The relatively large optical mode size of such optical waveguides (a few microns) limits interactions with sub-micron wavelength GHz-frequency acoustic waves. Electromechanical Brillouin scattering has been utilized to achieve frequency shifts exceeding 10 GHz but this approach suffers from low efficiencies on the order of $10^{-5}$ and sub-optimal carrier suppression.

Commercially known AOFSs employ bulk acoustic waves and provide acceptable extinction ratio, large carrier suppression, and high optical efficiencies for large optical bandwidths using large discrete components and a few Watts of radio frequency (RF) power.

Some known integrated AOFSs operate with surface acoustic waves deflecting light confined by an ion diffused layer, but its relatively large optical mode size (a few microns) limits interactions with sub-micron-wavelength gigahertz acoustic waves.

Conventional distributed optical resonant cavities decrease the effective velocity of the light being deflected, thus increasing interaction time which presents as increased efficiency. The increased mode size and resonant cavity geometry reduces possible instantaneous bandwidth and geometry restricts applications.

Single-tone amplitude modulation is known and operates by integrating waveguide structures into acoustic resonant cavity for enhanced efficiency. However, significant bandwidth (limited by Q of acoustic cavity) is not supported and has a restricted class of applications.

Another type of modulator using electromechanically driven suspended acousto-optic waveguides have been utilized to achieve frequency shifts exceeding 10 GHz, an example of which is disclosed by L. Shao, et al., "Microwave-to-optical conversion using lithium niobate thin-film acoustic resonators," Optica 6(12), 1498-1505 (2019), which is incorporated herein by reference. This type of modulator has low efficiencies of ~1E-5 and weak carrier suppression.

In additional to AOFSs, electro-optic devices can achieve optical frequency shifting by destructive interference between arms of Mach Zehnder modulators, by serrodyne frequency shifting and by employing electro-optic cavities.

SUMMARY

An acoustic-optic modulator refers to a device that utilizes an acoustic-optic effect to diffract light using sound waves. A substrate material is subjected to an oscillating signal that causes the substrate to vibrate and generate acoustic waves that change the index of refraction of the substrate material proportional to the intensity of the instantaneous value of the oscillating signal at that point on the substrate. The light scatters off the resulting index modulation in accordance to the physical principles of Bragg diffaction. The modulator funaions analogously to an RF mixer, wherein the sum or difference frequencies between the optical and the RF frequencies are imparted onto the diffracted light according to Stokes and Anti-Stokes frequency shifting theory.

Embodiments of the disclosure provide methods and apparatus for an integrated acousto-optic frequency shifter (AOFS) capable of operation at multi-GHz acoustic frequencies. In one example embodiment, an AOFS is fabricated on a thin-film lithium niobate (LN) platform to provide, for example, a signal in the order of about 3 GHz traveling acoustic wave that deflects a 1.5 um wavelength optical beam at the Bragg angle of 18 degrees with >30 dB of carrier suppression in the deflected frequency-shifted beam.

In embodiments, an example integrated AOFS is fabricated using Lithium Niobate on Insulator (LNOI), comprising X-cut lithium niobate thin film on a silicon dioxide layer deposited on a silicon substrate. Alternatively, z-cut lithium niobite on Sapphire can be used. LNOI offers superior acoustic and optical mode confinement. The lithium niobate thin film confines both 1.5 μm (1.5E-6 m), or other, wavelength light and 3 GHz, or other, acoustic waves. AOFS embodiments described are fully supported by the substrate, thereby providing improved robustness and greater power-handling ability when compared to suspended acousto-optic devices. The traveling acoustic wave deflects the input light and shifts its optical frequency. An AOFS can be configured for either anti-Stokes (upshifted) or Stokes (downshifted) frequency shifts.

In one aspect, a photonic acoustic-optic frequency shifter comprises: an input port to receive input light; an acoustic wave generator to generate an acoustic wave into a deflection area comprising a layer of lithium niobate; and a first output port to exit light deflected in frequency by the acoustic wave in the deflection area.

A photonic acoustic-optic frequency shifter can further include one or more of the following features: the acoustic wave generator comprises an interdigitated transducer (IDT), a first input waveguide formed in the layer of lithium niobate to confine the input light from the input port to the deflection area, a first output waveguide formed in the layer of lithium niobate to confine the deflected light from the deflection area to the first output port, and a second output waveguide formed in the layer of lithium niobate to confine the transmitted light from the deflection area to the second output port, one or more of the first input waveguide, the first output waveguide, and/or the second output waveguide comprises a taper, the layer of lithium niobate is formed on an oxide layer, the oxide layer is supported by a substrate, a sensor array to receive the deflected light, the sensor array comprises a focal plane array, lenses, waveguides or any combination thereof between the output port and the sensor array, the sensor array comprises a focal plane array, one or more additional photonic acousto-optic frequency shifters arranged so that optical signals from the frequency shifters have path lengths that are an integer number of wavelengths of being identical for coherent combination at the sensor array, and/or one or more additional photonic acousto-optic frequency shifters arranged so that optical signals from the frequency shifters have path lengths that are not an integer number of wavelengths of being identical pathlengths for non-coherent combination at the sensor array.

In another aspect, a method comprises: for a photonic acoustic-optic frequency shifter, employing an input port to receive input light; employing an acoustic wave generator to generate an acoustic wave into a deflection area comprising a layer of lithium niobate; and employing a first output port to exit light deflected in frequency by the acoustic wave in the deflection area.

A method can further include one or more of the following features: the acoustic wave generator comprises an interdigitated transducer (IDT), a first input waveguide formed in the layer of lithium niobate to confine the input light from the input port to the deflection area, a first output waveguide formed in the layer of lithium niobate to confine the deflected light from the deflection area to the first output port, and a second output waveguide formed in the layer of lithium niobate to confine the transmitted light from the deflection area to the second output port, one or more of the first input waveguide, the first output waveguide, and/or the second output waveguide comprises a taper, the layer of lithium niobate is formed on an oxide layer, the oxide layer is supported by a substrate, a sensor array to receive the deflected light, the sensor array comprises a focal plane array, lenses, waveguides or any combination thereof between the output port and the sensor array, the sensor array comprises a focal plane array, one or more additional photonic acousto-optic frequency shifters arranged so that optical signals from the frequency shifters have path lengths that are an integer number of wavelengths of being identical for coherent combination at the sensor array, and/or one or more additional photonic acousto-optic frequency shifters arranged so that optical signals from the frequency shifters have path lengths that are not an integer number of wavelengths of being identical pathlengths for non-coherent combination at the sensor array.

BRIEF DESCRIPTION OF THE DRAWINGS

The foregoing features of this disclosure, as well as the disclosure itself, may be more fully understood from the following description of the drawings in which.

DETAILED DESCRIPTION

Figure 1A:
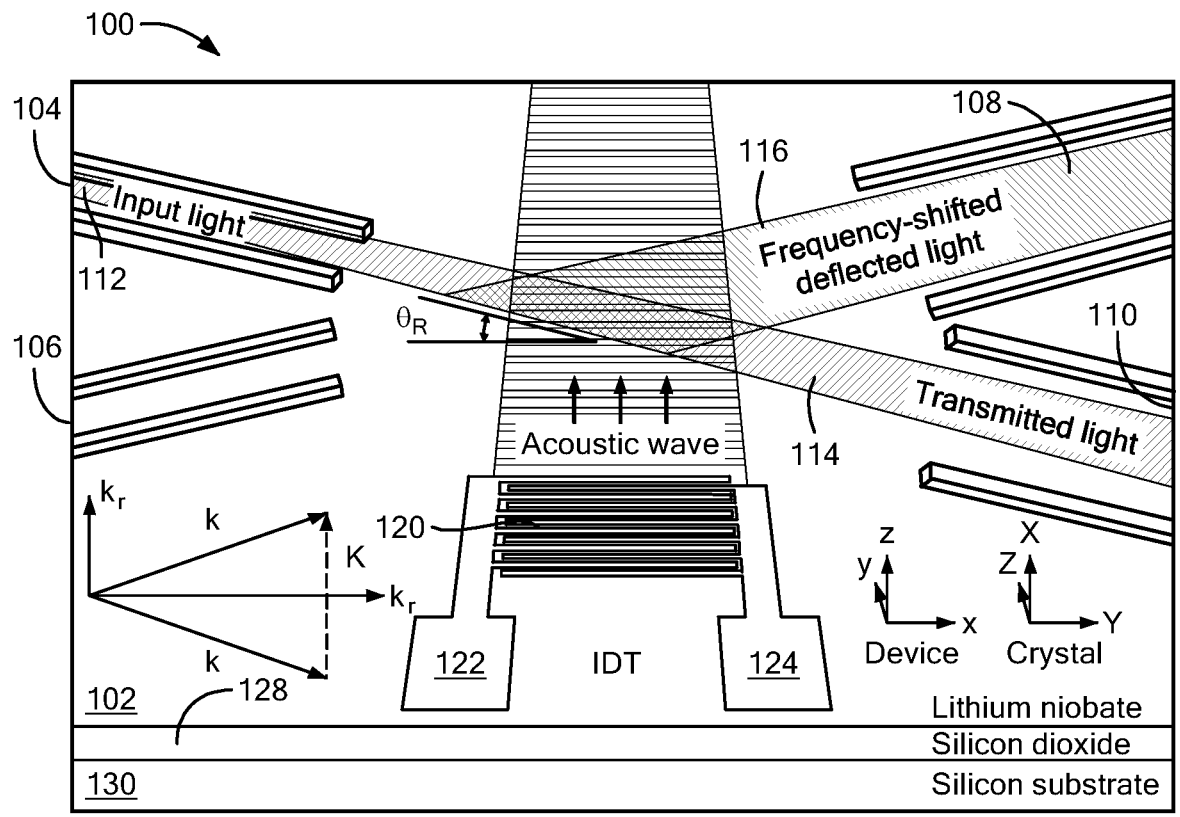
FIGS. 1A and 1B are schematic representations of example integrated photonic acoustic-optic frequency shifters (modulators) having a lithium niobate substrate in accordance with example embodiments of the disclosure.
Figure 1B:
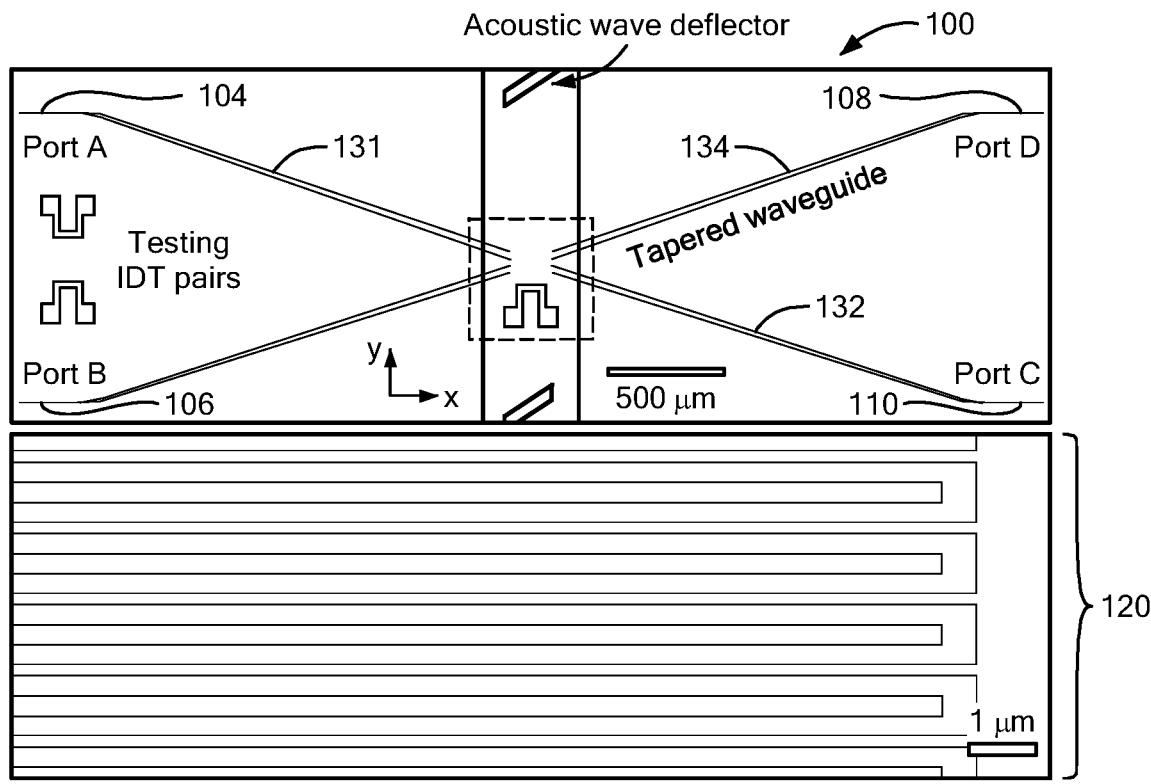

FIGS. 1A and 1B show an example integrated photonic acoustic-optic frequency shifter (modulator) 100 having a lithium niobate substrate 102 in accordance with example embodiments of the disclosure. In embodiments the integrated photonic acoustic-optic frequency shifter 100 has first and second input ports 104, 106 and first and second output ports 108, 110. The integrated photonic acoustic-optic frequency shifter 100 receives input light 112 at the first input port 104 and outputs frequency-shifted light 116 at the first output port 108, and optionally outputs transmitted light 114 at the second output port 110.

The modulator 100 includes an interdigitated transducer (IDT) 120 to generate a travelling acoustic wave into an acousto-optic material, shown as lithium niobate 102, that interacts with the input light 112. First and second signal inputs 122, 124, which may be configured to receive an RF signal, are coupled to the IDT 120 to generate the acoustic wave.

In embodiments, the photonic acousto-optic modulator 100 the thin film Lithium Niobate layer 102 is integrated into the modulator. In example embodiments, the Lithium Niobate layer 102 is disposed on a silicon dioxide layer 128 supported by a silicon substrate 130. It is understood that other suitable oxide and substrate materials can be used to meet the needs of a particular application. Examples include titanium dioxide and aluminum oxide for the oxide layer, and Sapphire for the substrate material. While any suitable thickness can be used, an example thickness of the Lithium Niobate layer is in the order of 0.7 mm.

The input light 112 is received at the first input port 104 (Port A) and confined by a first input tapered waveguide 131 formed in the Lithium Niobate layer 102 toward the IDT 120. The acoustic wave from the IDT 120 diffracts some of the light. Undiffracted transmitted light 114 exits the modulator via a first output tapered waveguide 132 at the first output port 110 and as frequency-shifted light 116 via a second output tapered waveguide 134 at the second output port 108.

With this arrangement, high acoustic frequency capability, e.g., 3 GHz, at moderate efficiency, e.g., 3.5%, can be achieved with a reduced SWAP compared to commercially-available modulators and existing PIC implementations. The Lithium Niobate layer 102 provides an acousto-optic waveguide structure where both acoustic and optic indices of lithium niobate are higher than those of the supporting insulator, guiding both waves without removal of the underlying substrate, as is required with suspended waveguides. Embodiments of the modulator leverage the large piezoelectric and photoelastic coefficients of Lithium Niobate, as well as the Lithium Niobate low microwave and optical propagation loss. Further embodiments may leverage the enhanced optical mode confinement compared to bulk deices from the large index difference between the Lithium Niobate layer and the surrounding insulator.

Figure 2A:
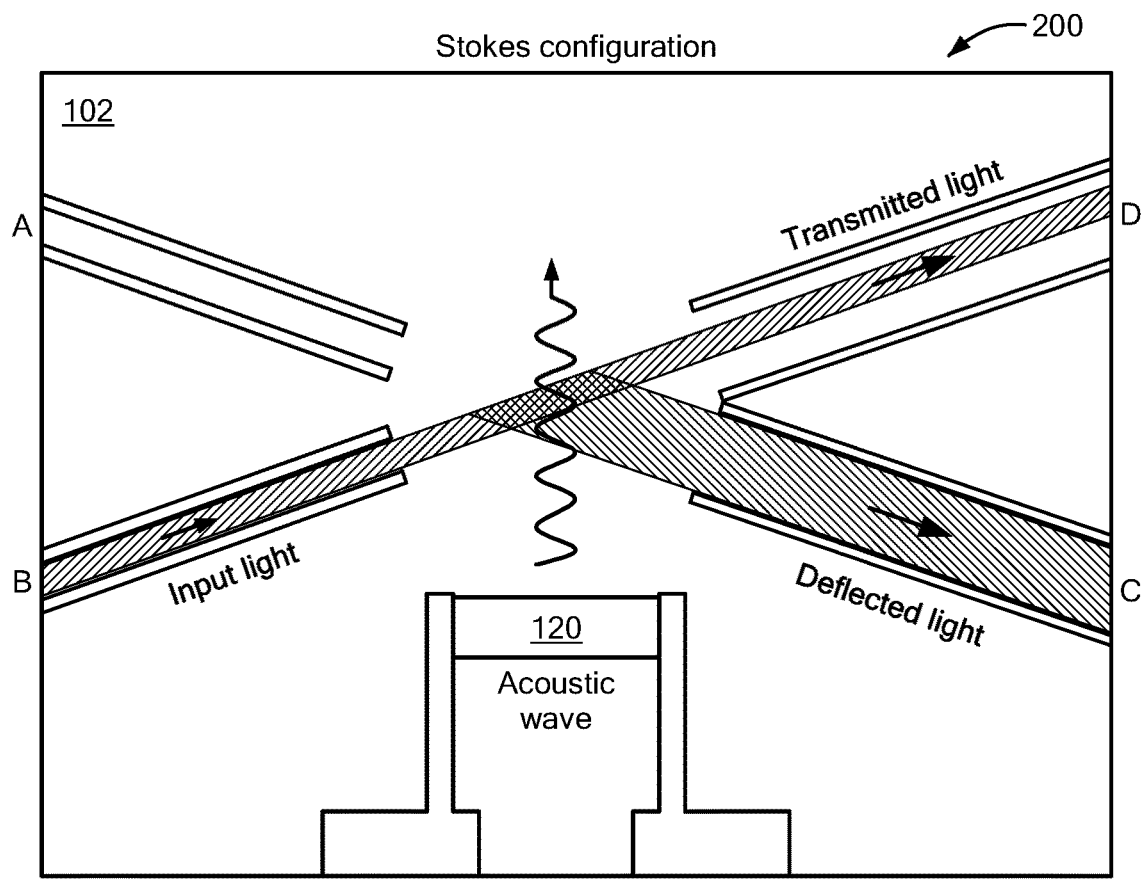
FIG. 2A is example integrated photonic acoustic-optic frequency shifter having a lithium niobate substrate in a Stokes configuration.
Figure 2B:
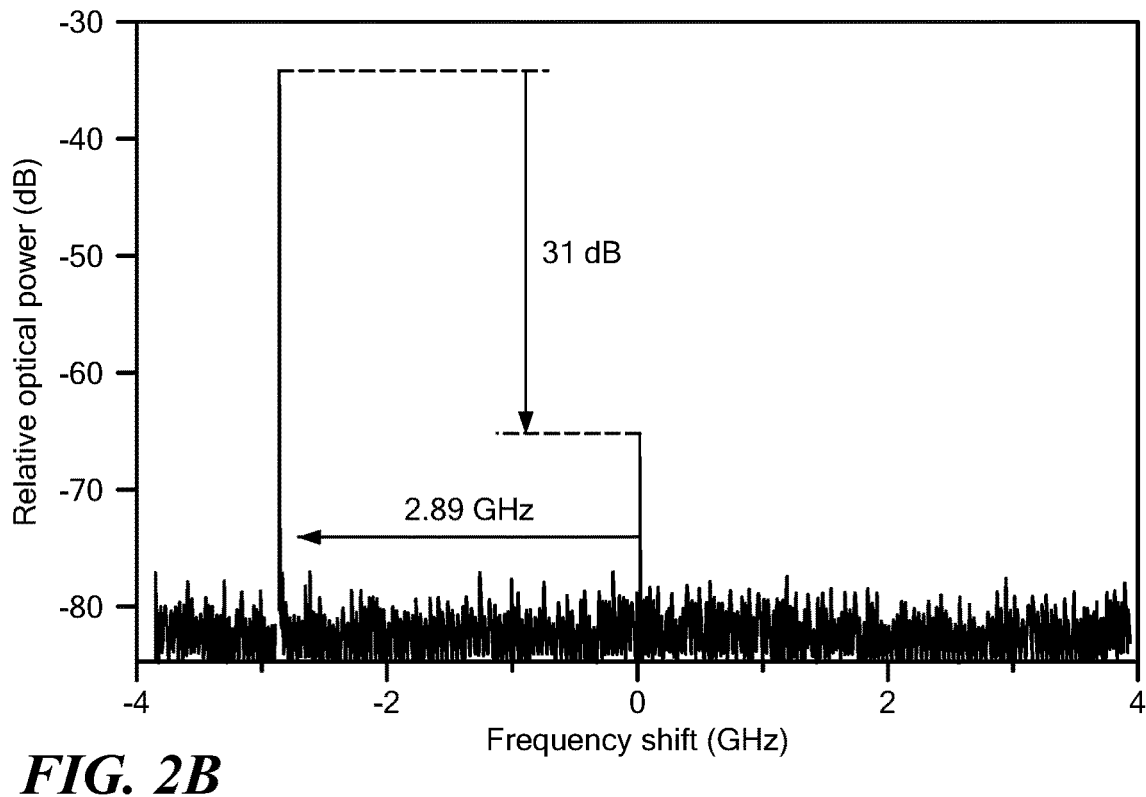
FIG. 2B is a waveform diagram showing frequency versus optical power for the integrated photonic acoustic-optic frequency shifter of FIG. 2A.

FIG. 2A shows an example integrated photonic acoustic-optic frequency shifter (modulator) 200 having a lithium niobate substrate 102 having a Stokes configuration (frequency downshift). Incoming light is received at Port B and transmitted light is output at Port D. Light deflected by the IDT 120 exits via Port C. FIG. 2B shows an example frequency downshift of 2.89 GHz and a carrier suppression of 31 dB.

Figure 2C:
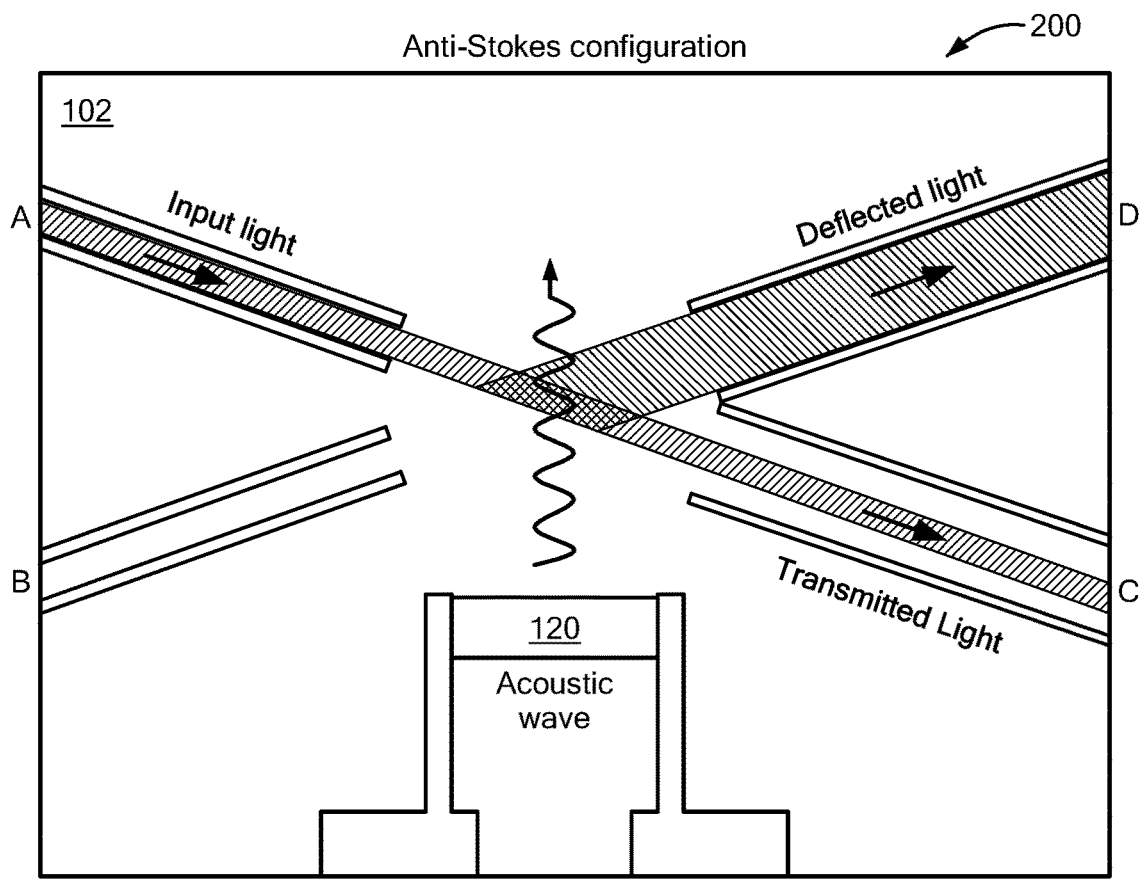
FIG. 2C is example integrated photonic acoustic-optic frequency shifter having a lithium niobate substrate in an anti-Stokes configuration.
Figure 2D:
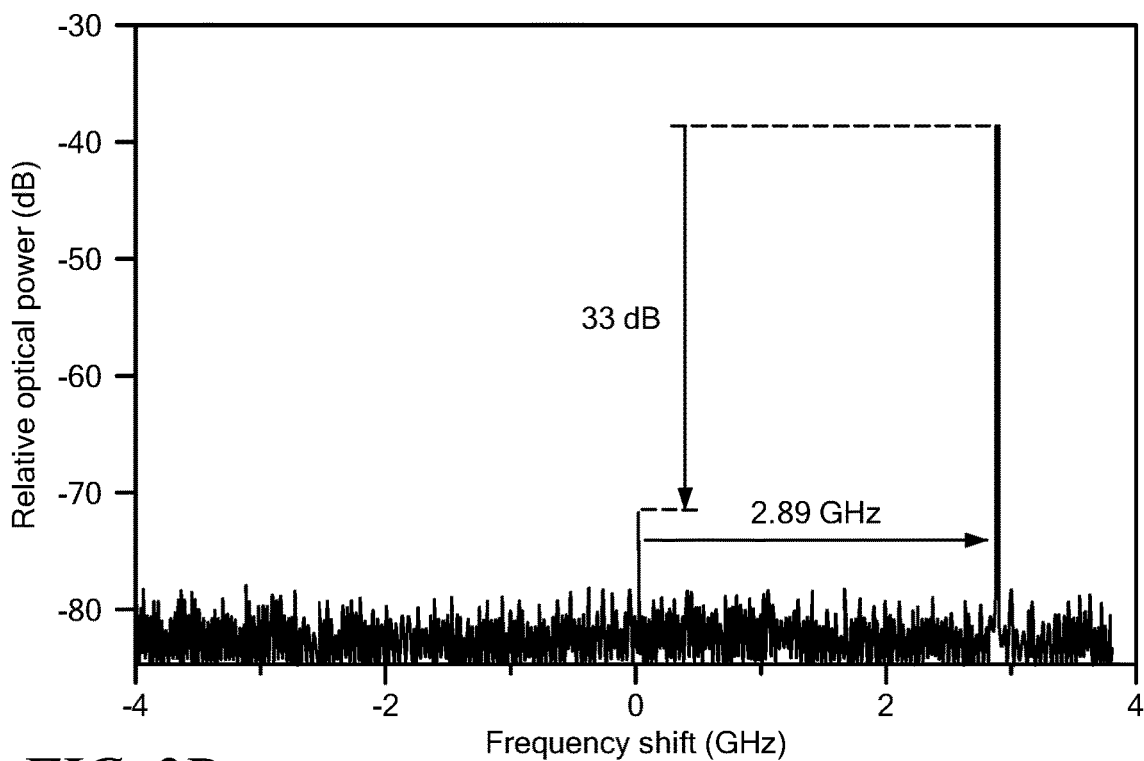
FIG. 2D is a waveform diagram showing frequency versus optical power for the integrated photonic acoustic-optic frequency shifter of FIG. 2C.

FIG. 2C shows an example integrated photonic acoustic-optic frequency shifter (modulator) 200 having a lithium niobate substrate 102 with an anti-Stokes configuration (upshift). Incoming light is received at Port A and transmitted light exits at Port C. Port B is unused and could be eliminated from the fabrication of this embodiment, it is there for convenience of alternate embodiments. Deflected light exits via Port D. FIG. 2D shows an example frequency upshift of 2.89 GHz and a carrier suppression of 33 dB.

Figure 3:
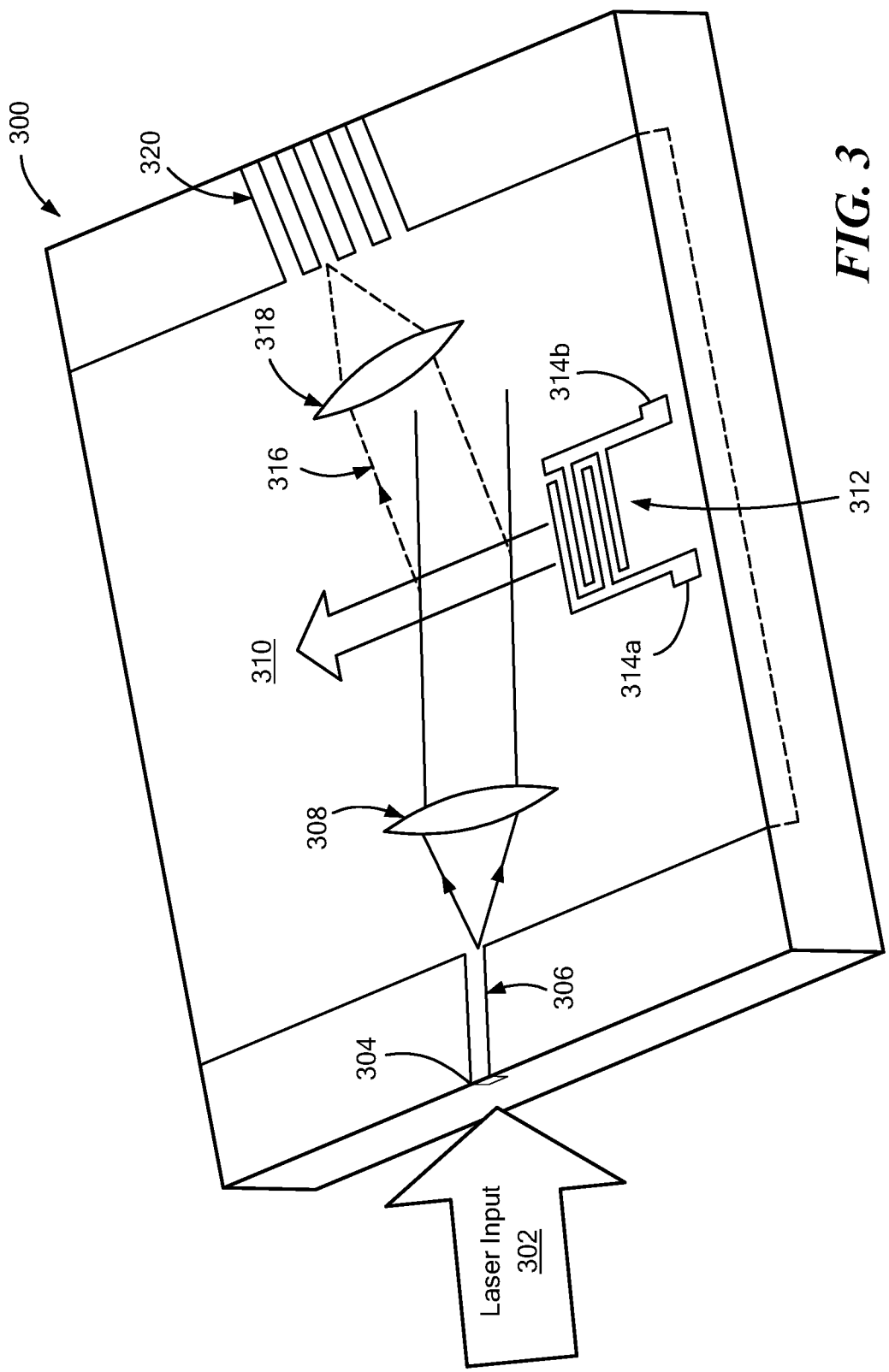
FIG. 3 is a schematic representation of an integrated photonic acoustic-optic frequency shifter having a lithium niobate substrate in accordance with example embodiments of the disclosure.

FIG. 3 shows an example implementation of an integrated photonic acoustic-optic frequency shifter (modulator) 300. A laser input signal 302 is received at an input port 304 coupled to a single mode channel waveguide 306 that feeds the signal to a first lens 308. A layer of lithium niobate 310 provides an acousto-optic waveguide for guiding light and acoustic waves. A transducer 312, such as an IDT, is coupled to first and second terminals 314a,b configured to receive an RF input signal for exciting the transducer to generate an acoustic wave into the diffraction area. Bragg diffracted light 316 travels to a second lens 318 which directs the light to a channel waveguide array 320. The diffracted light exits via one or more output channels that provide light onto a sensor array, such as a focal plane array FPA.

Figure 4:
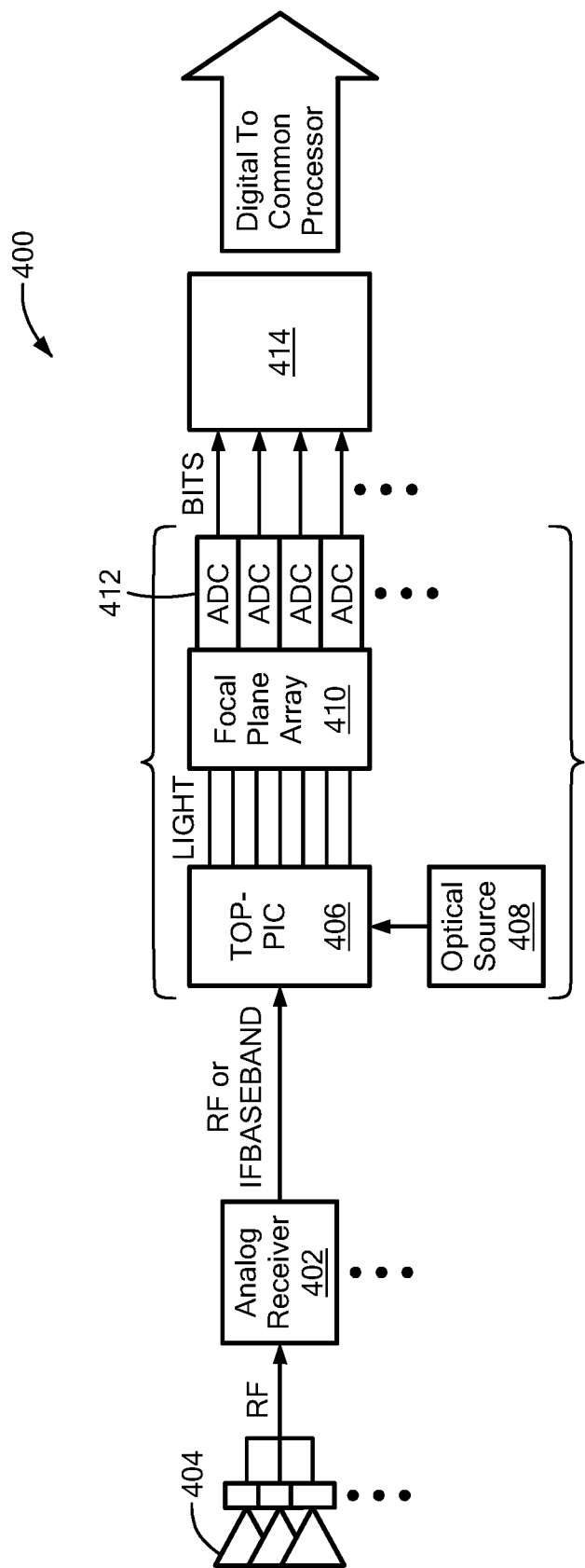
FIG. 4 is a schematic representation of a system having an integrated photonic acoustic-optic frequency shifter having a lithium niobate substrate in accordance with example embodiments of the disclosure.

FIG. 4 shows an example photonic integrated circuit (PIC) implementation 400. An analog receiver 402 receives one or more RF input signals from one or more antennas 404, for example. An acoustic modulator PIC 406 receives the RF input signal(s) and light from an optical source 408, such as a laser. The PIC 406 comprises an integrated thin film Lithium Niobate layer, such as described above. The PIC 406 outputs light signals onto a focal plane array 410, which may comprise one or more pixel arrays. As described above, the RF signals may diffract light from the optical source 408. The amount of diffraction corresponds to the characteristic of the RF signals. The upconverted (downconverted) RF signal is diffracted in angle proportional to RF frequency component, with each RF component intensity proportional to the signal intensity at that frequency. Thus, the geometry of the configuration to focus the diffracted light onto individual sensors, sometimes using intermediary lenses, optical waveguides, or other formatters, defines the frequency resolution of the detected RF frequency, and the detection and digitizing speed can be significantly reduced in proportion to the frame rate of the sensor array or focal plane array. In example embodiments, respective analog-to-digital converters (ADC) 412 digitize the FPA outputs for processing by a digital circuit 414, such as an FPGA.

Embodiments of the disclosure provide robust devices with deflection efficiencies of about 2-40% in a form factor significantly smaller than known devices with reduced power requirements. At telecommunication wavelengths, such as about 1.5 μm, we demonstrate an optical frequency shift of 3 GHz with carrier suppression over 30 dB and the opposite sideband suppression >40 dB (below the noise floor).

It is understood that embodiments of integrated photonic acoustic-optic frequency shifters having an integrated thin film Lithium Niobate layer are useful in a wide variety of applications, such as Fourier transform engines, cross-spectrum correlators (and convolution engines), space-time joint transforms, neural network engines, and the like.

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A photonic acoustic-optic frequency shifter, comprising:
   an input port to receive input light;
   an acoustic wave generator to generate an acoustic wave into a deflection area comprising a layer of lithium niobate;
   a first output port to exit light shifted in frequency by the acoustic wave in the deflection area; and
   lenses, waveguides or any combination thereof after the first output port,
   wherein the layer of lithium niobate is formed on an oxide layer.

2. The photonic acoustic-optic frequency shifter according to claim 1, wherein the acoustic wave generator comprises an interdigitated transducer (IDT).

3. The photonic acoustic-optic frequency shifter according to claim 1, further including a first input waveguide formed in the layer of lithium niobate to confine the input light from the input port to the deflection area.

4. The photonic acoustic-optic frequency shifter according to claim 3, further including a first output waveguide formed in the layer of lithium niobate to confine the light shifted in frequency from the deflection area to the first output port.

5. The photonic acoustic-optic frequency shifter according to claim 3, further including a first output waveguide formed in the layer of lithium niobate to confine the light shifted in frequency from the deflection area to the first output port, and a second output waveguide formed in the layer of lithium niobate to confine the input light from the deflection area to a second output port.

6. The photonic acoustic-optic frequency shifter according to claim 5, wherein one or more of the first input waveguide, the first output waveguide, and/or the second output waveguide comprises a taper.

7. The photonic acoustic-optic frequency shifter according to claim 1, wherein the oxide layer is supported by a substrate.

8. The photonic acoustic-optic frequency shifter according to claim 1, further including a sensor array to receive the light shifted in frequency.

9. The photonic acoustic-optic frequency shifter according to claim 8, wherein the sensor array comprises a focal plane array.

10. The photonic acoustic-optic frequency shifter according to claim 8, wherein the lenses, waveguides or any combination thereof are between the first output port and the sensor array.

11. The photonic acoustic-optic frequency shifter according to claim 10, wherein the sensor array comprises a focal plane array.

12. The photonic acoustic-optic frequency shifter according to claim 10, further including one or more additional photonic acousto-optic frequency shifters arranged so that optical signals from the frequency shifters have path lengths that are an integer number of wavelengths of being identical for coherent combination at the sensor array.

13. The photonic acoustic-optic frequency shifter according to claim 10, further including one or more additional photonic acousto-optic frequency shifters arranged so that optical signals from the frequency shifters have path lengths that are not an integer number of wavelengths of being identical pathlengths for non-coherent combination at the sensor array.

14. The photonic acoustic-optic frequency shifter according to claim 12, wherein the sensor array comprises a focal plane array.

15. A method, comprising:
  for a photonic acoustic-optic frequency shifter, employing an input port to receive input light;
  employing an acoustic wave generator to generate an acoustic wave into a deflection area comprising a layer of lithium niobate;
  employing a first output port to exit light shifted in frequency by the acoustic wave in the deflection area; and
  employing lenses, waveguides or any combination thereof after the first output port,
  wherein the layer of lithium niobate is formed on an oxide layer.

16. The method according to claim 15, wherein the acoustic wave generator comprises an interdigitated transducer (IDT).

17. The method according to claim 15, further including employing a first input waveguide formed in the layer of lithium niobate to confine the input light from the input port to the deflection area.

18. The method according to claim 17, further including employing a first output waveguide formed in the layer of lithium niobate to confine the light shifted in frequency from the deflection area to the first output port.

19. The method according to claim 17, further including employing a first output waveguide formed in the layer of lithium niobate to confine the light shifted in frequency from the deflection area to the first output port, and a second output waveguide formed in the layer of lithium niobate to confine the input light from the deflection area to a second output port.

* * * * *